US005086392A

United States Patent [19]
Nakajima

[11] Patent Number: 5,086,392
[45] Date of Patent: Feb. 4, 1992

[54] RADIATION IMAGE DIAGNOSTIC APPARATUS

[75] Inventor: Nobuyoshi Nakajima, Kanagawa, Japan

[73] Assignee: Fuji Photo Film Co., Ltd., Kanagawa, Japan

[21] Appl. No.: 260,349

[22] Filed: Oct. 20, 1988

[30] Foreign Application Priority Data

Oct. 20, 1987 [JP] Japan .............................. 62-265004
Oct. 20, 1987 [JP] Japan .............................. 62-265005
Oct. 20, 1987 [JP] Japan .............................. 62-265014
Oct. 20, 1987 [JP] Japan .............................. 62-265015

[51] Int. Cl.$^5$ .................................... G06F 15/00
[52] U.S. Cl. ...................... 364/413.22; 364/413.13; 340/716; 340/717
[58] Field of Search ............... 364/413.13, 413.22, 364/521, 300; 340/716, 717, 798, 799

[56] References Cited

U.S. PATENT DOCUMENTS

| 4,527,060 | 7/1985 | Suzuki et al. | 250/327.2 |
|---|---|---|---|
| 4,653,112 | 3/1987 | Ouimette | 382/69 |
| 4,672,683 | 6/1987 | Matsueda | 382/57 |
| 4,804,841 | 2/1989 | Nakajima et al. | 250/327.2 |
| 4,817,050 | 3/1989 | Komatsu | 364/900 |

Primary Examiner—Dale M. Shaw
Assistant Examiner—L. Brutman
Attorney, Agent, or Firm—Sughrue, Mion, Zinn Macpeak & Seas

[57] ABSTRACT

A radiation image diagnostic apparatus comprises a reader for obtaining a radiation image signal representing a radiation image of an object from a recording medium, an ID information input device for entry of ID information on the object, and a storage device for storing past radiation image signals and ID information corresponding thereto. A retrieval device retrieves a radiation image signal for comparison, which is of the same object as the object of the radiation image signal related to diagnosis obtained by the reader and which has been obtained prior to the radiation image signal related to diagnosis, from the past radiation image signals stored in the storage device based on the ID information entered from the ID information input device. A display device displays the radiation image related to diagnosis which the radiation image signal related to diagnosis represents and a radiation image for comparison which the retrieved radiation image signal for comparison represents side by side so that they are viewed simultaneously.

8 Claims, 5 Drawing Sheets

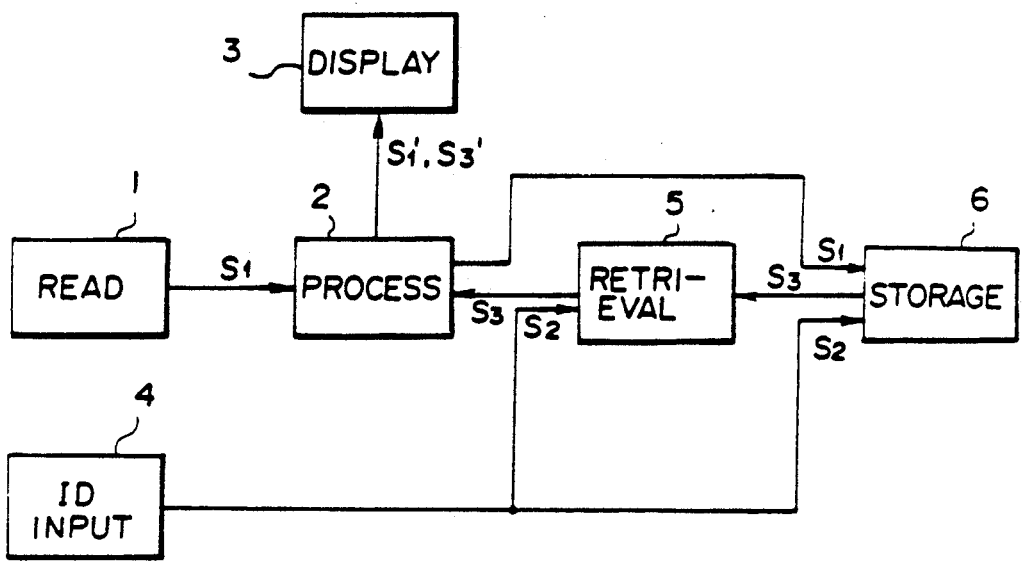
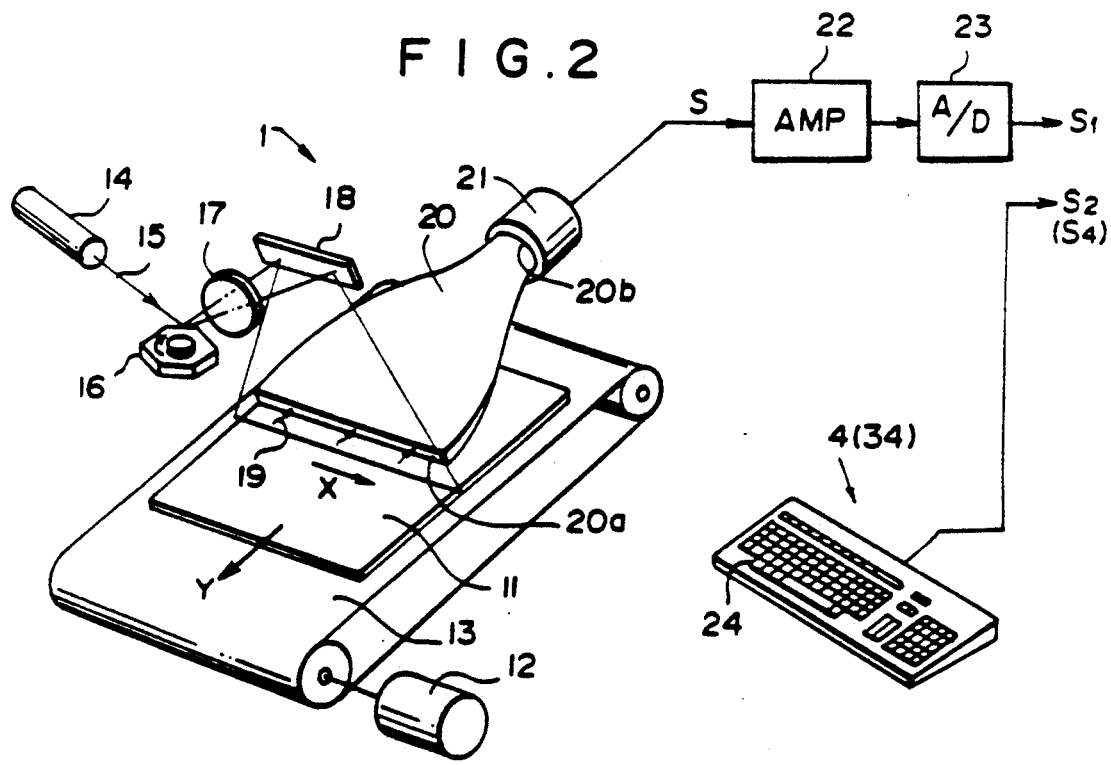

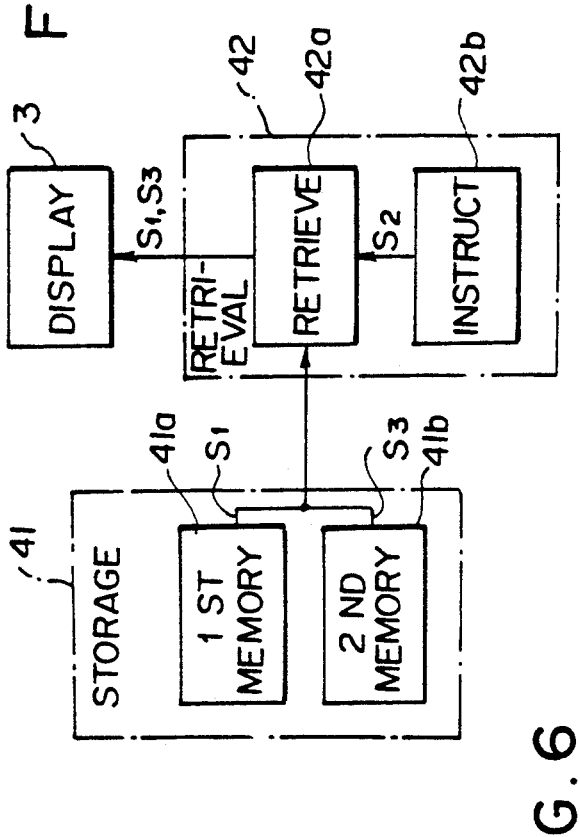
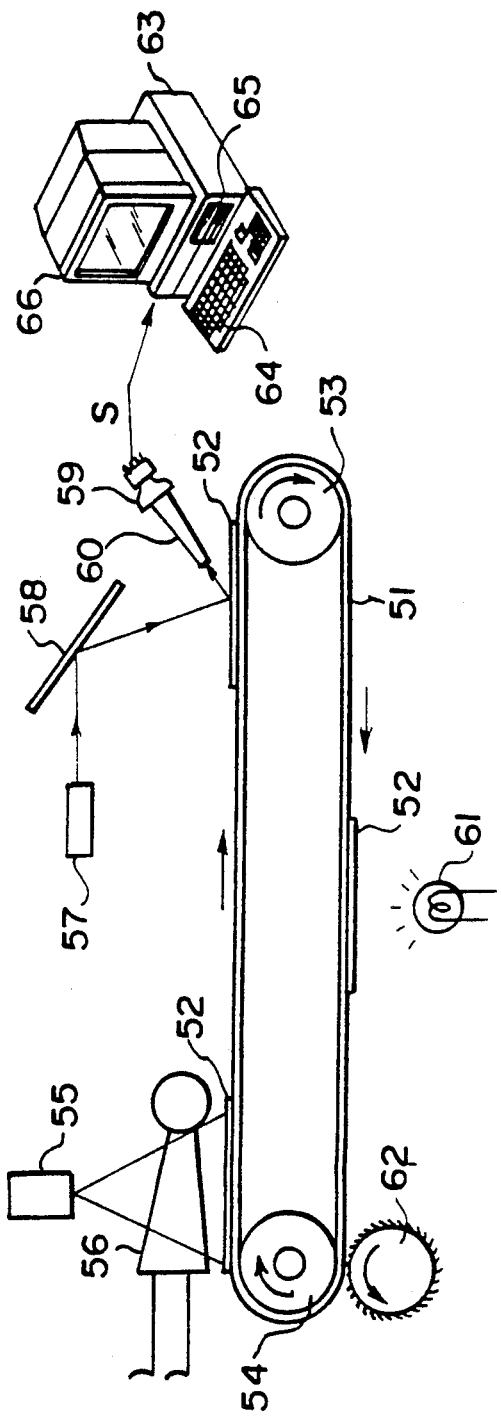

RADIATION IMAGE DIAGNOSTIC APPARATUS

BACKGROUND OF THE INVENTION

1. Field of the Invention

This invention relates to a radiation image diagnostic apparatus for reproducing and displaying a radiation image of an object on a display means.

2. Description of the Prior Art

There have heretofore been used methods wherein an object is exposed to radiation such as X-rays to record a radiation image of the object, a radiation image signal representing the radiation image is obtained, various algorithms for image processing are carried out on the image signal, and the radiation image of the object is reproduced and displayed as a visible image on a display means.

When a stimulable phosphor is exposed to a radiation such as X-rays, α-rays, β-rays, γ-rays, cathode rays or ultraviolet rays, it stores a part of the energy of the radiation. Then, when the stimulable phosphor which has been exposed to the radiation is exposed to stimulating rays such as visible light, light is emitted by the stimulable phosphor in proportion to the stored energy of the radiation. As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned by stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, image processing is carried out on the electric image signal, and the radiation image of the object is reproduced as a visible image by use of the processed image signal on a recording medium such as a photographic film, a display means such as a cathode ray tube (CRT), or the like.

In general, with the aforesaid radiation image recording and reproducing system, a single image is displayed at one time in the course of reproducing and displaying the radiation image on the display means such as the CRT display device. Therefore, in the case where two radiation images are to be compared with each other for the viewing of the condition of progress of a disease, hard copies have heretofore been formed one by one and viewed.

In order to view and compare the hard copies, it is necessary to provide a reproduction means capable of forming the hard copies. In the case where the hard copies are unnecessary in ordinary operations and the reproduction means for the formation of the hard copies is provided only for the purpose of the viewing and comparison, the equipment cost becomes unnecessarily high. Also, in the case where the reproduction means for the formation of the hard copies is provided, it is often desired that images be viewed and compared simply even though the hard copies need not be specially formed for comparison. Specifically, comparison of an image related to current viewing, particularly diagnosis, with a past image of the same object as the object of said image related to current viewing, or with a standard image representing the standard condition of said image related to current viewing.

The term "standard condition" as used herein means, for example, the condition prior to pressing or the standard condition of deformation in the case where the condition of deformation in a specific machine part caused by the pressing is to be investigated by use of a radiation image, or the condition of a standard appearance of a specific disease in a radiation image in the case where the specific disease of a specific portion of the human body is to be investigated by use of a radiation image, or a plurality of standard conditions of deformation in respective steps of the aforesaid deformation or a plurality of standard conditions of the disease in respective steps of the aforesaid disease.

In this specification, each group classified in accordance with the machine part, the object portion or the name of disease or the like is referred to as "kind", and a plurality of standard change conditions with respect to the same kind, for example, a plurality of standard deformation steps of the machine part and steps of progress of the disease are referred to as "steps".

SUMMARY OF THE INVENTION

The primary object of the present invention is to provide a radiation image diagnostic apparatus which enables comparison of a radiation image of an object related to current viewing with a past radiation image of the same object without hard copies being formed.

Another object of the present invention is to provide a radiation image diagnostic apparatus which enables comparison of a radiation image of an object related to current viewing with a standard image representing a standard condition of the radiation image without hard copies being formed.

The present invention provides a first radiation image diagnostic apparatus comprising:

i) a read-out means for obtaining a radiation image signal representing a radiation image of an object from a recording medium carrying said radiation image of said object recorded thereon, ii) an ID information input means for entry of ID information on said object, iii) a storage means for storing past radiation image signals and ID information corresponding to said past radiation image signals, iv) an image processing means for carrying out image processing of said radiation image signal obtained by said read-out means and of a radiation image signal read from said storage means, v) a retrieval means for retrieving a single radiation image signal for comparison or a plurality of radiation image signals for comparison, which are of the same object as said object of said radiation image signal related to diagnosis obtained by said read-out means and which have been obtained before said radiation image signal related to diagnosis is obtained, from said past radiation image signals stored in said storage means on the basis of the ID information entered from said ID information input means in accordance with said radiation image signal related to diagnosis, and vi) a display means for reproducing and displaying the radiation image related to diagnosis which said radiation image signal related to diagnosis fed from said read-out means represents and a radiation image for comparison which said radiation image signal for comparison retrieved by said retrieval means represents, said display means displaying said radiation image related to diagnosis and said radiation image for comparison side by side so that they are viewed simultaneously.

The present invention also provides a second radiation image diagnostic apparatus comprising:
i) a read-out means for obtaining a radiation image signal representing a radiation image of an object from a recording medium carrying said radiation image of said object recorded thereon,
ii) a kind input means for entry of a kind of said object,
iii) a storage means for storing standard image signals obtained from standard images representing standard conditions of radiation images,
iv) an image processing means for carrying out image processing of said radiation image signal obtained by said read-out means,
v) a retrieval means for retrieving a single standard image signal or a plurality of standard image signals corresponding to said radiation image signal, which are stored in said storage means, on the basis of the kind entered from said kind input means, and
vi) a display means for reproducing and displaying the radiation image which said radiation image signal obtained by said read-out means represents and a standard image which said standard image signal retrieved by said retrieval means represents, said display means displaying said radiation image and said standard image side by side so that they are viewed simultaneously.

The present invention further provides a third radiation image diagnostic apparatus comprising:
i) a read-out means for obtaining a radiation image signal representing a radiation image of an object from a recording medium carrying said radiation image of said object recorded thereon,
ii) a kind input means for entry of a kind of said object,
iii) a storage means for storing a plurality of standard image signals obtained from standard images representing standard conditions of a plurality of steps of radiation images for each of a plurality of kinds,
iv) a retrieval means for automatically discriminating the step in the kind of said radiation image signal obtained by said read-out means, and retrieving a single standard image signal or a plurality of standard image signals corresponding to said step of said radiation image signal, which are stored in said storage means, on the basis of the kind entered from said kind input means and said step discriminated automatically, and
v) a display means for reproducing and displaying the radiation image which said radiation image signal obtained by said read-out means represents and a standard image which said standard image signal retrieved by said retrieval means represents, said display means displaying said radiation image and said standard image side by side so that they are viewed simultaneously.

The present invention still further provides a fourth radiation image diagnostic apparatus comprising:
i) a storage means for storing a radiation image signal obtained from a radiation image of an object and ID information corresponding to said radiation image signal,
ii) a retrieval means for retrieving a single radiation image signal for comparison or a plurality of radiation image signals for comparison, which are stored in said storage means and are of the same object as the object of the radiation image signal related to diagnosis and which have been obtained before said radiation image signal related to diagnosis is obtained, on the basis of the ID information corresponding to said radiation image signal related to diagnosis stored in said storage means, and
iii) a display means for reproducing and displaying the radiation image related to diagnosis which said radiation image signal related to diagnosis read from said storage means represents and a radiation image for comparison which said radiation image signal for comparison retrieved by said retrieval means represents, said display means displaying said radiation image related to diagnosis and said radiation image for comparison side by side so that they are viewed simultaneously.

The present invention also provides a fifth radiation image diagnostic apparatus comprising:
i) a storage means for storing a radiation image signal obtained from a radiation image of an object, a kind corresponding to said radiation image signal, and standard image signals obtained from standard images representing standard conditions of radiation images,
ii) a retrieval means for retrieving a single standard image signal or a plurality of standard image signals corresponding to said radiation image signal, which are stored in said storage means, on the basis of the kind of said radiation image signal stored in said storage means, and
iii) a display means for reproducing and displaying the radiation image which said radiation image signal read from said storage means represents and a standard image which said standard image signal retrieved by said retrieval means represents, said display means displaying said radiation image and said standard image side by side so that they are viewed simultaneously.

The present invention further provides a sixth radiation image diagnostic apparatus comprising:
i) a storage means for storing a radiation image signal obtained from a radiation image of an object, a kind corresponding to said radiation image signal, and a plurality of standard image signals obtained from standard images representing standard conditions of a plurality of steps of radiation images for each of a plurality of kinds,
ii) a retrieval means for automatically discriminating the step in the kind of said radiation image signal store in said storage means, and retrieving a single standard image signal or a plurality of standard image signals corresponding to said step of said radiation image signal, which are stored in said storage means, on the basis of the kind of said radiation image signal and said step discriminated automatically, and
iii) a display means for reproducing and displaying the radiation image which said radiation image signal read from said storage means represents and a standard image which said standard image signal retrieved by said retrieval means represents, said display means displaying said radiation image and said standard image side by side so that they are viewed simultaneously.

With the first and fourth radiation image diagnostic apparatuses in accordance with the present invention provided with the retrieval means for retrieving the past radiation image signal for comparison, which is of the same object as the object of the radiation image signal related to diagnosis, from a plurality of the past radiation image signals stored in the storage means on the basis of the ID information corresponding to the radiation image signal related to diagnosis, the past radiation image signal for comparison which is of the same object as the object of the radiation image signal related to diagnosis can be found. Also, with the first and fourth radiation image diagnostic apparatuses wherein the display means reproduces and displays the radiation image related to diagnosis, which the radiation image signal related to diagnosis represents, and the radiation image for comparison, which the radiation image signal for comparison found in the manner as mentioned above represents, side by side so that both images are viewed simultaneously, the radiation image related to diagnosis of an object which is to be currently viewed and the past radiation image for comparison of the same object can be compared with each other for investigating a change with the passage of time or the like without hard copies being formed.

Furthermore, with the first radiation image diagnostic apparatus in accordance with the present invention provided with the image processing means, the radiation image related to diagnosis and the radiation image for comparison can be appropriately image-processed for facilitating the comparison.

With the second and fifth radiation image diagnostic apparatuses in accordance with the present invention provided with the retrieval means for retrieving a single standard image signal or a plurality of standard image signals corresponding to the radiation image signal related to diagnosis from the standard image signals stored in the storage means on the basis of the kind entered from the kind input means or the kind of the radiation image signal stored in the storage means, the standard image signal of the same kind as the radiation image signal can be found. Also, with the second and fifth radiation image diagnostic apparatuses in accordance with the present invention wherein the display means reproduces and displays the radiation image, which the radiation image signal represents, and the standard image, which the standard image signal represents, side by side so that both images are viewed simultaneously, the radiation image which is to be currently viewed and the standard image representing the standard condition of the radiation image can be compared with each other to investigate, for example, the extent of difference of the radiation image from the standard image, and the step to which the radiation image belongs.

With the third and sixth radiation image diagnostic apparatuses in accordance with the present invention, the storage means stores a plurality of the standard image signals obtained from the standard images representing standard conditions of a plurality of steps of radiation images for each of a plurality of kinds. Also, in this case, the retrieval means automatically discriminates the step in the kind of the radiation image signal related to diagnosis, and retrieves a single standard image signal or a plurality of standard image signals corresponding to the radiation image signal related to diagnosis from the standard image signals stored in the storage means on the basis of the kind of the radiation image signal and the step discriminated automatically. Also, as with the second and fifth radiation image diagnostic apparatuses in accordance with the present invention, the display means reproduces and displays the radiation image and the standard image side by side so that they are viewed simultaneously. Therefore, the radiation image which is to be viewed currently and the standard image obtained in the manner as mentioned above and representing the same step as the step of the radiation image or two standard images representing two steps in the case where the radiation image belongs to the middle between the two steps can be compared with each other for investigating a different of the radiation image from the standard image, such as a specific feature of the radiation image which the standard image does not have, without hard copies being formed.

With the aforesaid second and fifth radiation image diagnostic apparatuses in accordance with the present invention, in the case where each kind includes a plurality of the steps and the standard image signal is present for each of a plurality of the steps, the viewer has to judge the step to which the radiation image belongs by comparing the radiation image with a plurality of the standard images obtained by the retrieval means. On the other hand, with the third and sixth radiation image diagnostic apparatuses in accordance with the present invention wherein the retrieval means is provided with the function of automatically recognizing the step in each kind of the radiation image signal, the standard image signal approximate to the radiation image signal can be obtained automatically. Therefore, the viewer need not carry out the troublesome judgment, and the diagnosis time can be shortened.

BRIEF DESCRIPTION OF THE DRAWINGS

FIG. 1 is a block diagram showing an embodiment of the first radiation image diagnostic apparatus in accordance with the present invention, FIG. 2 is a perspective view showing an example of the read-out means and an example of the ID information input means, FIG. 5 is a block diagram showing an embodiment of the fourth radiation image diagnostic apparatus in accordance with the present invention, FIG. 6 is a perspective view showing an example of the radiation image recording and read-out apparatus for obtaining the radiation image signal and ID information.

DESCRIPTION OF THE PREFERRED EMBODIMENTS

Figure 3A:
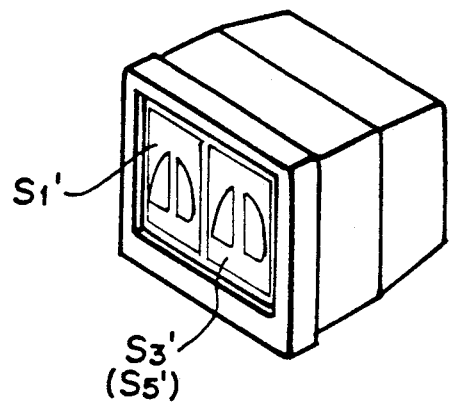
FIGS. 3A, 3B and 3C are perspective views showing examples of the display means.

The present invention will hereinbelow be described in further detail with reference to the accompanying drawings.

With reference to FIG. 1 showing an embodiment of the first radiation image diagnostic apparatus in accordance with the present invention, a radiation image signal S1 representing a radiation image of an object is obtained by a read-out means 1 as will be described later from a recording medium carrying the radiation image recorded thereon. The radiation image signal S1 obtained is a radiation image signal related to diagnosis which is to be viewed currently. The radiation image signal S1 related to diagnosis is fed to an image processing means 2 which carries out image processing appropriately in accordance with the radiation image signal, and the image-processed radiation image signal S1' related to diagnosis is sent to a display means 3. Also, for comparison with a radiation image signal obtained thereafter by the read-out means 1, the radiation image signal S1 related to diagnosis is sent to a storage means and stored therein together with ID information S2 as will be described later.

The ID information S2 of the object corresponding to the radiation image signal S1 related to diagnosis obtained by the read-out means 1 is entered from an ID information input means 4 to a retrieval means 5. In the case where this embodiment is used for diagnosis of a disease of the human body by way of example, the term "ID information S2" as used herein means the name of the patient, the date of image recording, the image recording portion and other information specifying the object. The ID information S2 is also sent to the storage means 6 and stored therein together with the radiation image signal S1 related to diagnosis as mentioned above.

The storage means 6 stores a plurality of radiation image signals of a plurality of objects read out by the read-out means 1 in the past and the ID information entered from the ID information input means 4 in accordance with the respective radiation image signals. A plurality of the radiation image signals and the ID information stored in the storage means 6 are not limited to the radiation image signals obtained by the read-out means 1 and the ID information entered from the ID information input means 4, and may be obtained from other read-out means or the like and stored in the storage means 6 via a magnetic disk, a magnetic tape or the like.

Upon receiving the ID information S2 from the ID information input means 4, the retrieval means 5 retrieves a single radiation image signal S3 for comparison or a plurality of radiation image signals S3, S3, . . . for comparison, which are of the same object as the object of the radiation image signal S1 related to diagnosis read out by the read-out means 1, from a plurality of the past radiation image signals stored in the storage means 6 on the basis of the I information S2.

The single radiation image signal S3 for comparison or a plurality of the radiation image signals S3, S3, . . . for comparison thus retrieved are subjected to necessary image processing in the image processing means 2. The single image-processed radiation image signal S3' for comparison or a plurality of the image-processed radiation image signals S3', S3', . . . for comparison are sent to the display means 3 together with the image-processed radiation image signal S1' related to diagnosis. On the basis of the radiation image signal S1' related to diagnosis and the radiation image signal S3' for comparison, the display means 3 reproduces and displays a radiation image related to diagnosis and a radiation image for comparison side by side so that they can be viewed simultaneously as will be described later.

FIG. 2 shows an example of the read-out means 1 and an example of the ID information input means 4.

The read-out means 1 shown in FIG. 2 utilizes a stimulable phosphor sheet.

With reference to FIG. 2, a stimulable phosphor sheet 11 carrying a radiation image of an object stored thereon is conveyed in a sub-scanning direction as indicated by the arrow Y by a sheet conveyance means 13 constituted by an endless belt or the like operated by a motor 12. On the other hand, stimulating rays 15 produced by a laser beam source 14 are reflected and deflected by a rotating polygon mirror 16 quickly rotated in the direction as indicated by the arrow, and pass through a converging lens 17 constituted by a $f\theta$ lens or the like. The optical path of the stimulating rays 15 is then changed by a mirror 18, and the stimulating rays 15 impinge upon the stimulable phosphor sheet 11 and scan it in a main scanning direction as indicated by the arrow X approximately normal to the sub-scanning direction as indicated by the arrow Y. As the stimulable phosphor sheet 11 is exposed to the stimulating rays 15, the exposed portion of the stimulable phosphor sheet 11 emits light 19 in an optical amount proportional to the stored radiation energy. The emitted light 19 is guided by a light guide member 20, and photoelectrically detected by a photomultiplier 21 as a photodetector. The light guide member 20 is made by the forming of a light guiding material such as an acrylic plate, and has a linear light input face 20a positioned to extend along the main scanning line on the stimulable phosphor sheet 11, and a ring-shaped light output face 20b closely contacted with a light receiving face of the photomultiplier 21. The emitted light 19 entering the light guide member 20 from its light input face 20a is guided through total reflection inside of the light guide member 20, emanates from the light output face 20b, and is received by the photomultiplier 21. In this manner, the amount of the emitted light 19 carrying the radiation image is detected by the photomultiplier 21.

An analog signal S generated by the photomultiplier 21 is amplified by an amplifier 22, and digitized by an A/D converter 23 with a predetermined scale factor. The signal thus digitized is fed as the radiation image signal S1 related to diagnosis into the image processing means 2 as mentioned above.

The read-out means 1 is not limited to the apparatus using the stimulable phosphor sheet and may, for example, be an apparatus for reading out an image signal representing an X-ray image by scanning a conventional X-ray photographic film carrying the X-ray image recorded thereon. Alternatively, the read-out means 1 may be an apparatus for reading out an image signal from a film on which an output image generated by a diagnosis device such as a CT scanner or US is recorded.

Before or after the radiation image is read out from the stimulable phosphor sheet 11 shown in FIG. 2, the ID information S2 on the object whose radiation image has been stored on the stimulable phosphor sheet 11 is entered from a keyboard 24 constituting the ID information input means 4. As mentioned above, the ID information S2 is sent to the retrieval means 5 and the storage means 6.

Figure 3B:
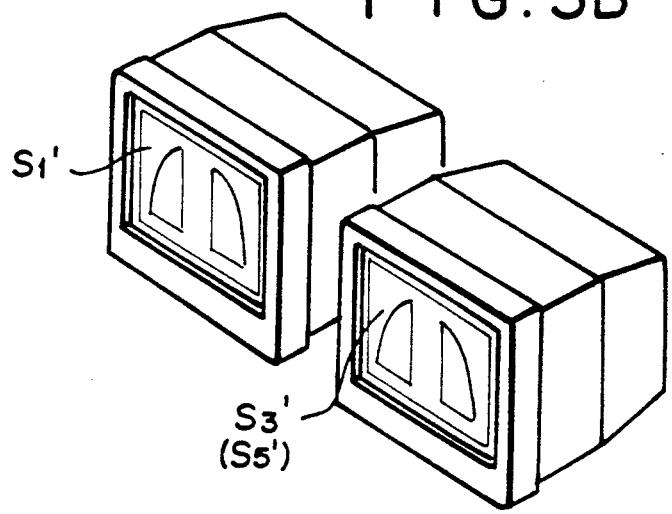
Figure 3C:
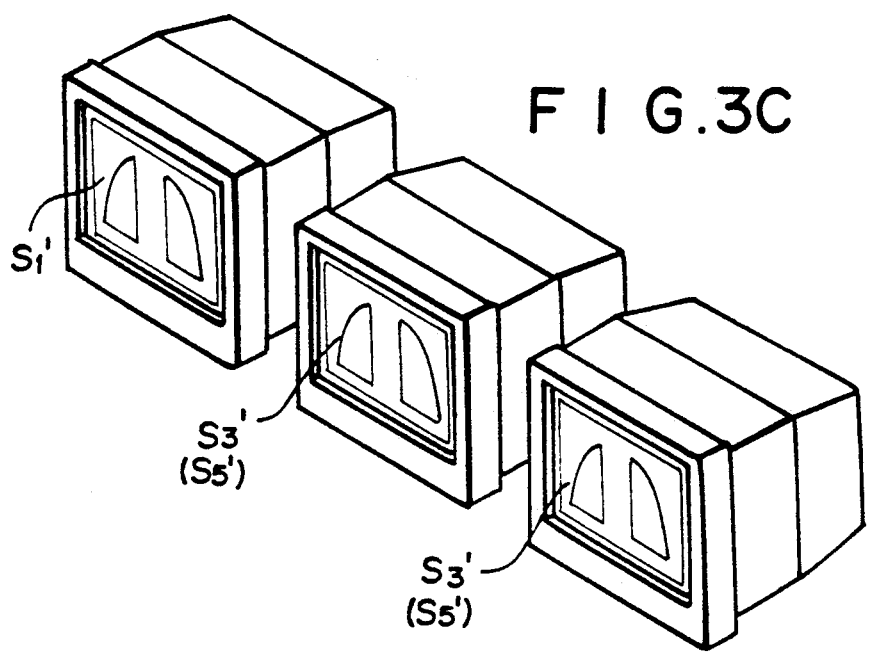

Examples of the display means 3 will be described hereinbelow with reference to FIGS. 3A, 3B and 3C. In FIGS. 3A, 3B and 3C, for simplicity of explanation, the symbols S1' and S3' denoting the image signals are used also for denoting the images.

With reference to FIG. 3A, a radiation image S1' related to diagnosis which the radiation image signal S1' related to diagnosis represents and a radiation image S3' for comparison which the radiation image signal S3' for comparison represents are displayed side by side on a single CRT display device. In the case where a plurality of radiation images S3', S3', ... for comparison are to be displayed, they may be made small and displayed side by side simultaneously together with the radiation image S1' related to diagnosis on the single CRT display. In the case where the images should not be made too small, the radiation image S1' related to diagnosis may be displayed continuously, and a plurality of the radiation images S3', S3', ... for comparison may be sequentially displayed one after another. In this case, a radiation image S3' for comparison closest to the date of image recording of the radiation image S1' related to diagnosis among a plurality of the radiation images S3', S3', ... for comparison should preferably be displayed first, and thereafter the radiation images S3', S3', ... for comparison prior to said radiation image S3' for comparison should be displayed retrospectively one after another, thereby to facilitate investigation of a change with the passage of time between the radiation image S1' related to diagnosis and the radiation images S3', S3', ... for comparison.

In the example shown in FIG. 3B, the radiation image S1' related to diagnosis is displayed on one of the two CRT display devices, and the radiation image S3' for comparison is displayed on the other of the CRT display devices. In the case where a plurality of the radiation images S3', S3', ... for comparison are to be displayed, a plurality of the images may be displayed on each CRT display device as in the example shown in FIG. 3A, or the radiation images S3', S3', ... for comparison may be displayed one after another.

In the example shown in FIG. 3C, three CRT display devices are provided side by side. In the case where only a single radiation image S3' for comparison is to be displayed, only two among the three CRT display devices may be used. In the case where a plurality of the radiation images S3', S3', ... for comparison are to be displayed, the radiation images S3', S3', ... for comparison in a number (two in this example) capable of being displayed simultaneously with the radiation image S1' related to diagnosis on the display means are displayed at the same time as the radiation image S1' related to diagnosis. In this case, in order to investigate the latest change, the radiation images S3', S3', ... for comparison should preferably be displayed retrospectively from the image recorded most lately to the previous images. In the case where there are some radiation images S3', S3', ... for comparison which cannot be displayed simultaneously, the images may be displayed one after another.

The number of the CRT display devices constituting the display means is not limited to one, two or three as shown in FIG. 3A, FIG. 3B or FIG. 3C, and the display means is not limited to the CRT display device.

Figure 4A:
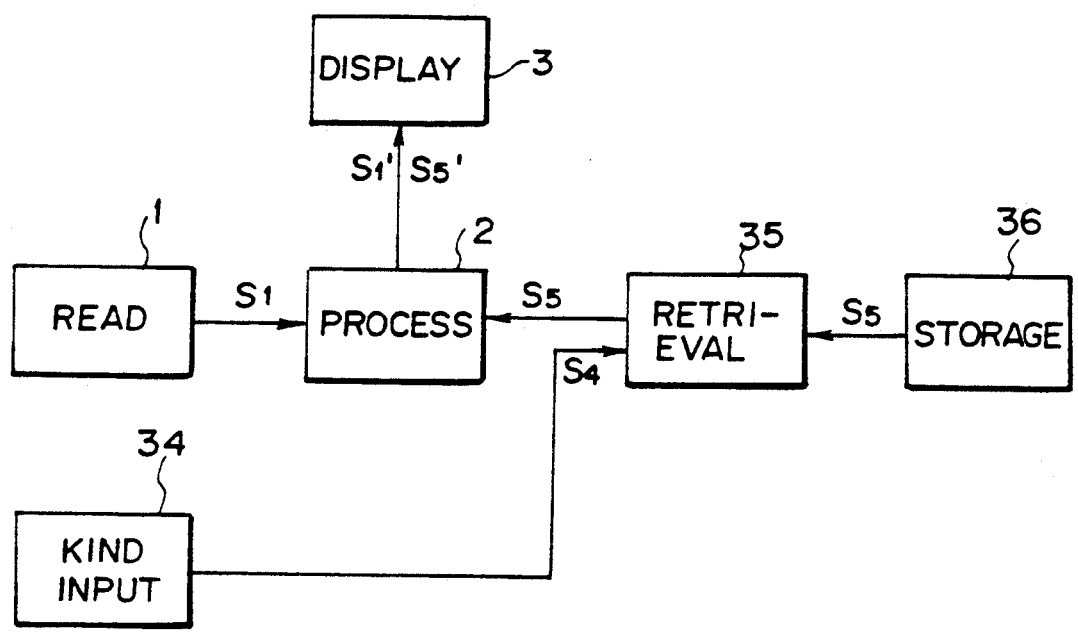
FIG. 4A is a block diagram showing an embodiment of the second radiation image diagnostic apparatus in accordance with the present invention.

An embodiment of the second radiation image diagnostic apparatus in accordance with the present invention will hereinbelow be described with reference to FIG. 4A. In FIG. 4A, similar elements are numbered with the same reference numerals with respect to FIG. 1 (this applies also to the subsequent drawings).

With reference to FIG. 4A the radiation image signal S1 obtained by the read-out means 1 as shown in FIG. 2 is the radiation image signal related to diagnosis which is to be viewed currently. The radiation image signal S1 is fed to the image processing means 2 which carries out image processing appropriately in accordance with the radiation image signal, and the image-processed radiation image signal S1' is sent to the display means 3.

Information S4 on the kind of the object corresponding to the radiation image signal S1 obtained by the read-out means 1 is entered from a kind input means 34 to a retrieval means 35. In the case where this embodiment is used for diagnosis of a disease of the human body by way of example, the term "kind information S4" as used herein means the image recording portion of the human body, the name of disease and other information specifying the group to which the object belongs. Also, radiation image signals representing standard appearances of various diseases in radiation images and radiation image signals representing typical radiation images or the like in various steps of progress of a specific disease are selected based on long experience from a plurality of the radiation image signals obtained by, for example, the read-out means 1, and are stored as standard image signals in the storage means 36. The standard image signals stored in the storage means 36 are not limited to the radiation image signals obtained by the read-out means 1, and may be obtained from other read-out means or the like and stored in the storage means 36 via a magnetic disk, a magnetic tape or the like. In the case where already-formed standard images are available, the standard image signals may be obtained by reading out the standard images by use of a digitizer or the like, instead of selecting the standard image signals from a plurality of the radiation image signals as mentioned above.

Upon receiving the kind information S4 from the kind input means 34, the retrieval means 35 retrieves a single standard image signal S5 or a plurality of standard image signals S5, S5, ..., which correspond to the radiation image signal S1 related to diagnosis read out by the read-out means 1, from a plurality of the standard image signals stored in the storage means 36 on the basis of the kind information S4.

The single standard image signal S5 or a plurality of the standard image signals S5, S5, ... thus retrieved are subjected to image processing in the image processing means 2 when necessary. The single standard image signal S5' or a plurality of the standard image signals S5', S5', ... passing through the image processing means 2 are sent to the display means 3. On the basis of the radiation image signal S1' and the standard image signal S5', the display means 3 reproduces and displays a radiation image and a standard image side by side so that they can be viewed simultaneously as will be described later.

Figure 4B:
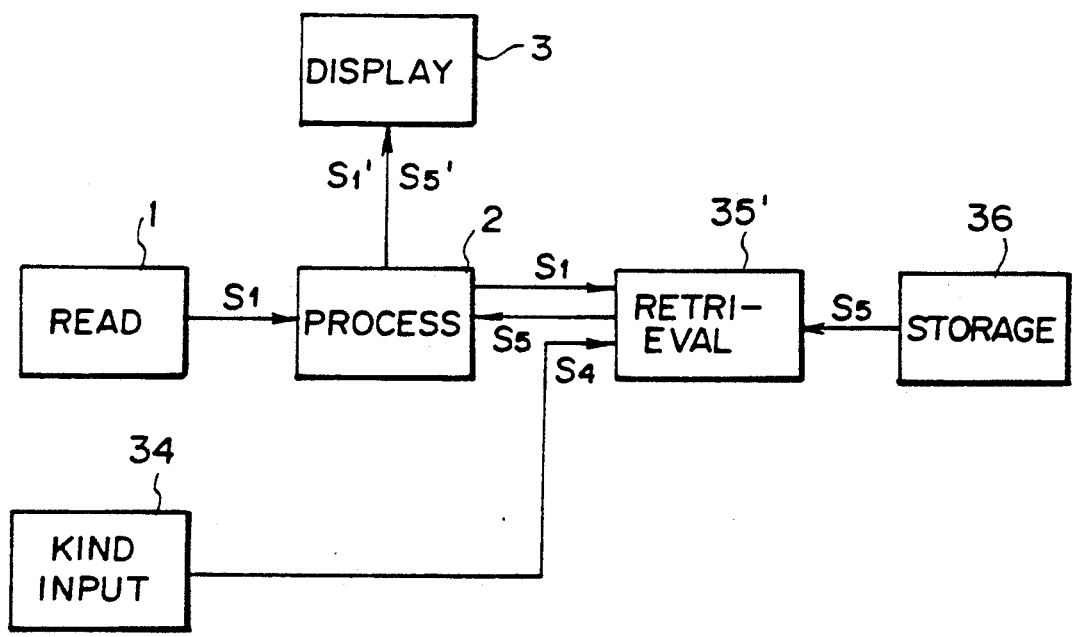
FIG. 4B is a block diagram showing an embodiment of the third radiation image diagnostic apparatus in accordance with the present invention.

An embodiment of the third radiation image diagnostic apparatus in accordance with the present invention will hereinbelow be described with reference to FIG. 4B. In FIG. 4B, similar elements are numbered with the same reference numerals with respect to FIG. 4A.

The radiation image signal S1 obtained by the read-out means 1 is subjected to appropriate image processing in the image processing means 2, and then sent to the display means 3 and a retrieval means 35'. Based on the kind information S4 entered from the kind input means 34 and the radiation image signal S1, the retrieval means 35' automatically discriminates the step in the kind of the radiation image signal S1 by, for example, the method as will be described later. Thereafter, based on the kind of the radiation image signal S1 and the step discriminated automatically, the retrieval means 35' retrieves a single standard image signal S5 or a plurality of standard image signals S5, S5, ... corresponding to the step of the radiation image signal S1 from a plurality of standard image signals stored in the storage means 36. The term "single standard image signal S5" as used herein means, for example, the standard image signal S5 in the same step as the step to which the radiation image signal S1 belongs, and the term "plurality of standard image signals S5, S5, ..." means, for example, the standard image signals S5, S5 in two steps in the case where the radiation image signal S1 belongs to the middle between the two steps.

As in the second radiation image diagnostic apparatus in accordance with the present invention, the single standard image signal S5 or a plurality of the standard image signals S5, S5, ... thus retrieved are sent to the display means 3 via the image processing means 2. The display means 3 reproduces and displays the radiation image and the standard image side by side so that they can be viewed simultaneously.

The method of automatically discriminating the step in the kind of the radiation image signal S1 in the retrieval means 35' will be described hereinbelow.

Any known method may be used as the method of automatic discrimination. A example of the method wherein a radiation image of pneumoconiosis is taken as one kind and a step in said kind is automatically discriminated will be briefly described below.

Pneumoconiosis includes symptoms such as shortness of breath and hard breath caused by dust inhaled and clinging to the lungs, and exhibits spot-like affected portions in a radiation image of the lungs. A plurality of standard steps are defined in accordance with the number of spots or the like related to the extent of the disease.

As the method of automatically discriminating the step of the pneumoconiosis radiation image, it is possible to employ a method utilizing a simultaneous occurrence matrix as described in "IEEE TRANSACTIONS SYSTEMS, MAN, AND CYBERNETICS", SMC-4, pp. 40-49, 1974, a method utilizing a mean density change in an extracted region as described in "IEEE TRANSACTIONS ON COMPUTERS", C-25, pp. 95-97, 1976, and a method based on linear prediction as described in "IYODENSHI TO SEITAIKOGAKU" (Medical Electronics and Biology), Vol. 20, No. 5, Sept. 1982. The method utilizing the simultaneous occurrence matrix will be described below.

First, the simultaneous occurrence matrix expressed as $$p(i,j,a,d) \quad (1)$$

is calculated for overall image signals inside of the lungs. In Formula (1), i and j each denote the density level and attains a value within the range of 0 to 7 (the overall density region is classified into eight levels). Also, a denotes the direction (angle) of a picture element at which the density level is equal to j, as viewed from a picture element at which the density level is equal to i, and picture elements present in the directions of 0°, 45°, 90° and 135° are employed. Furthermore, d denotes the distance from the picture element at which the density level is equal to i to the picture element at which the density level is equal to j, and picture elements at distances of 1, 3, 7 and 11 are employed.

Thereafter, based on the simultaneous occurrence matrix p(i,j,a,d) calculated in the manner as mentioned above, five reference amounts T1 (a,d) to T5 (a,d) are calculated as represented by formulas $$T_1(a,d) = \sum_{i=0}^{7} \sum_{j=0}^{7} ij p(i,j,a,d) \quad (2)$$

$$T_2(a,d) = \sum_{i=0}^{7} \sum_{j=0}^{7} (i-j)^2 p(i,j,a,d) \quad (3)$$

$$T_3(a,d) = \sum_{i=0}^{7} \sum_{j=0}^{7} \frac{p(i,j,a,d)}{1+(i-j)^2} \quad (4)$$

$$T_4(a,d) = \sum_{i=0}^{7} \sum_{j=0}^{7} p(i,j,a,d) \log p(i,j,a,d) \quad (5)$$

$$T_5(a,d) = \sum_{i=0}^{7} \sum_{j=0}^{7} |i-j|^2 p(i,j,a,d) \quad (6)$$

On the basis of T1 (a,d) to T5(a,d) thus calculated, a mean value $\overline{M}k(d)$, a range Rk(d) and a variance Vk(d) where k=1, 2, ..., 5 are calculated as represented by formulas $$\overline{M}_k(d) = \frac{1}{4} \sum_{a=1}^{4} T_k(a,d) \quad (7)$$

$$R_k(d) = \max T_k(a,d) - \min T_k(a,d) \quad (8)$$

$$V_k(d) = \frac{1}{4} \sum_{a=1}^{4} (T_k(a,d) - \overline{M}_k(d))^2 \quad (9)$$

In the aforesaid formulas, k=1, 2, ..., 5, and values of a=1, 2, 3 and 4 are made to correspond to the directions of 0°, 45°, 90° and 135° respectively.

As for 60 reference amounts in total of formulas (7), (8) and (9) or some reference amounts determined from among these reference amounts, values are calculated in accordance with the calculation formulas shown above. The values thus calculated are compared with values of reference amounts classified in advance for each step on the basis of many pneumoconiosis images, and the step to which the pneumoconiosis image related to diagnosis belongs is discriminated. By way of example, in the case of classification into four steps, the reference amounts of R4(3), $\overline{M}5(1)$, R5(7), V4(3), $\overline{M}5(e)$, V5(3) and $\overline{M}1(3)$ are used.

After the step of the pneumoconiosis radiation image is automatically discriminated by carrying out the aforesaid operations in the retrieval means 35', the standard image signal corresponding to said step is read from the storage means 36 and sent to the display means 3, and the standard image is reproduced and displayed together with the pneumoconiosis radiation image on the display means 3.

As the standard image and the radiation image in the steps corresponding to each other are reproduced and displayed together, it is possible to compare both images with each other and to investigate the presence or absence of a condition inherent to a pneumoconiosis patient which does not appear in the standard image, the lightness or heaviness of the disease in the same steps as compared with the standard image, or the closeness to one of the standard images in two steps in the case where the radiation image belongs to the middle between the two steps.

In the case of the embodiment shown in FIG. 4A, before or after the radiation image is read out from the stimulable phosphor sheet 11 as shown in FIG. 2, the kind information S4 on the object whose radiation image has been stored on the stimulable phosphor sheet 11 is entered from the keyboard 24 constituting the kind input means 34 to the retrieval means 35.

Examples of the display means 3 in the embodiments shown in FIGS. 4A and 4B will be described hereinbelow with reference to FIGS. 3A, 3B and 3C. In FIGS. 3A, 3B and 3C, for simplicity of explanation, the symbols S1' and S5' denoting the image signals are used also for denoting the images.

With reference to FIG. 3A, the radiation image S1' which the radiation image signal S1' represents and a standard image S5' which the standard image signal S5' represents are displayed side by side on a single CRT display device. In the case where a plurality of standard images S5', S5', . . . are to be displayed, they may be made small and displayed side by side simultaneously together with the radiation image S1' on the single CRT display. In the case where the images should not be made too small, the radiation image S1' may be displayed continuously, and a plurality of the standard images S5', S5', . . . may be sequentially displayed one after another. In this case, a standard image S5' corresponding to the step present at an end when a plurality of the standard images S5', S5', . . . are arranged side by side in the sequence of the steps should preferably be displayed first, and thereafter the standard images S5', S5', . . . in the adjacent steps should be displayed one after another, thereby to facilitate investigation of the standard image S5' to which the radiation image S1' is approximate.

In the example shown in FIG. 3B, the radiation image S1' is displayed on one of the two CRT display devices, and the standard image S5' is displayed on the other of the CRT display devices. In the case where a plurality of the standard images S5', S5', . . . are to be displayed, a plurality of the images may be displayed on each CRT display device as in the example shown in FIG. 3A, or the standard images S5', S5', . . . may be displayed one after another.

In the example shown in FIG. 3C, three CRT display devices are provided side by side. In the case where only a single standard image S5' is to be displayed, only two among the three CRT display devices may be used. In the case where a plurality of the standard images S5', S5', . . . are to be displayed, the standard images S5', S5', . . . in a number (two in this example) capable of being displayed simultaneously with the radiation image S1' on the display means are displayed at the same time as the radiation image S1'. In this case, the standard images S5', S5', . . . as approximate to the radiation image S1' as possible should preferably be selected as the standard images S5', S5', . . . displayed at the same time as the radiation image S1'. In the case where there are some standard images S5', S5', . . . which cannot be displayed simultaneously, the images may be displayed one after another.

An embodiment of the fourth radiation image diagnostic apparatus in accordance with the present invention will hereinbelow be described with reference to FIG. 5.

With reference to FIG. 5, a plurality of the radiation image signals obtained by a radiation image recording and read-out apparatus as will be described later and the ID information on the objects of the respective radiation image signals are stored in a storage means 41. The storage means 41 is divided into a first memory 41a for storing the radiation image signals, which are to be diagnosed from now on and which have been obtained in, for example, a mobile X-ray diagnostic station such as a traveling X-ray diagnostic station in the form of a vehicle like a bus, and the ID information corresponding to the radiation image signals, and a second memory 41b for storing a plurality of the radiation image signals obtained in the past and the ID information corresponding thereto. The first memory 41a and the second memory 41b may be or may not be physically separated from each other, and are herein referred to as being conceptually separated from each other for simplicity of explanation.

At the time the ID information S2 corresponding to the radiation image related to diagnosis which is to be displayed on the display means 3 is entered from an instruction input section 42b comprising a keyboard or the like in a retrieval means 42 into a retrieval section 42a in the retrieval means 42, the retrieval section 42a retrieves the radiation image signal S1 related to diagnosis corresponding to the entered ID information S2 from the radiation image signals stored in the first memory 41a, and sends the retrieved radiation image signal S1 related to diagnosis to the display means 3. Also, the retrieval section 42a retrieves a single radiation image signal S3 for comparison or a plurality of radiation image signals S3, S3, . . . for comparison, which are of the same object as the object of the radiation image signal S1 related to diagnosis, from a plurality of the past radiation image signals stored in the second memory 41b on the basis of the ID information S2, and sends the single radiation image signal S3 for comparison or a plurality of the radiation image signals S3, S3, . . . for comparison to the display means 3 together with the radiation image signal S1 related to diagnosis. On the basis of the radiation image signal S1 related to diagnosis and the radiation image signal S3 for comparison, the display means 3 reproduces and displays a radiation image related to diagnosis and a radiation image for comparison side by side so that they can be viewed simultaneously. The display means 3 may display the images in the same manner as in the example of display based on the radiation image signal S1' related to diagnosis and the radiation image signal S3' for comparison in the first radiation image diagnostic apparatus in accordance with the present invention as mentioned above with reference to FIGS. 3A, 3B and 3C.

The embodiment shown in FIG. 5 is not provided with the image processing means for carrying out image processing of the radiation image signal. However, appropriate image processing may be carried out on the radiation image signal obtained by, for example, the radiation image recording and read-out apparatus as will be described later, and the processed radiation image signal may be transferred to the fourth radiation image diagnostic apparatus in accordance with the present invention. In this case, the fourth radiation image diagnostic apparatus in accordance with the present invention need not be provided with the image processing means. It is also possible to constitute a radiation image diagnostic apparatus provided with the image processing means.

FIG. 6 shows an example of the radiation image recording and read-out apparatus for obtaining the radiation image signal to be transferred to the fourth radiation image diagnostic apparatus in accordance with the present invention and the ID information corresponding to the radiation image signal. This example of the radiation image recording and read-out apparatus utilizes the stimulable phosphor sheet.

With reference to FIG. 6, three stimulable phosphor sheets 52, 52, 52 are secured in equally spaced relation on an endless belt conveyor 51. The conveyor 51 to which the stimulable phosphor sheets 52, 52, 52 are secured is engaged with a driving roller 53 and a driven roller 54, and moved in the direction as indicated by the arrow by the driving roller 53 which is rotated by a drive unit (not shown). In the vicinity of the driven roller 54 is disposed a radiation source 55 to face the conveyor 51. The radiation source 55 may be an X-ray source or the like, and projects a radiation image of an object 56 positioned between the sheets 52, 52, 52 and the radiation source 55 onto the sheets 52, 52, 52. In the vicinity of the driving roller 53 are disposed a stimulating ray source 57 for producing stimulating rays such as a laser beam, a light deflector 58 constituted by a galvanometer mirror or the like for deflecting the stimulating rays produced by the stimulating ray source 57 in the width direction of the conveyor 51, and a photodetector 59 for reading out the light emitted by the sheets 52, 52, 52 upon stimulation thereof by the stimulating rays. The photodetector 59 may be constituted by a head-on type photomultiplier, a photoelectric amplification channel plate or the like. The photodetector 59 detects the light emitted by the sheets 52, 52, 52 upon stimulation thereof and guided by a light guide member 60. An erasing light source 61 is disposed facing the conveyor 51 on the side opposite to the radiation source 55, the stimulating ray source 57 and the photodetector 59. The erasing light source 61 produces light having a wavelength within the stimulation wavelength range of the stimulable phosphor sheets 52, 52, 52 irradiated onto the sheets 52, 52, 52 to cause them to release the radiation energy stored thereon. The erasing light source 61 may be constituted by, e.g., a tungsten-filament lamp, a halogen lamp, an infrared lamp, or a laser source as disclosed in U.S. Pat. No. 4,400,619. Since the radiation energy stored on the sheets 52, 52, 52 can also be eliminated by heating them as disclosed in, for example, Japanese Unexamined Patent Publication No. 56(1981)-12599, the erasing light source 61 may be replaced by a heating means. A cylindrical cleaning roller 62 is opposed to the driven roller 54 with the conveyor 51 intervening therebetween. The cleaning roller 62 is rotated counterclockwise in the drawing by a drive unit (not shown), and removes dust from the surfaces of the sheets 52, 52, 52 moving in contact with the cleaning roller 62. If necessary, the cleaning roller 62 may be of an electrostatic attraction type which collects dust and the like by an electrostatic force.

The light guide member 60 may be of a material and a construction as disclosed in U.S. Pat. Nos. 4,346,265 and 4,369,367, U.S. patent application Ser. No. 168,805, and Japanese Unexamined Patent Publication No. 56(1981)-11395, and may be used by the method disclosed therein.

The radiation image recording and read-out apparatus having the aforesaid configuration is operated as described below. The conveyor 51 is intermittently moved by the distance corresponding to one-third of the entire circumference thereof at a time by the driving roller 53. The stopping position of the conveyor 51 is adjusted so that one stimulable phosphor sheet 52 faces the radiation source 55 when the conveyor 51 stops. When the conveyor 51 is stopped, the radiation source 55 is turned on to cause the sheet 52 facing the radiation source 55 to store the radiation image of the object 56. After the radiation image is recorded on the sheet 52, the conveyor 51 is further moved by the distance of one-third the conveyor circumference and stopped. At this time, the sheet 52 carrying the radiation image stored thereon is stopped in the position facing the light deflector 58 and the photodetector 59, and scanned with the stimulating rays produced by the stimulating ray source 57. Scanning is conducted in the width direction of the conveyor 51 (main scanning) by the light deflector 58, and also in the length direction of the conveyor 51 (sub-scanning) by the movement of a stage (not shown) carrying the stimulating ray source 57, the light deflector 58, the photodetector 59 and the light guide member 60 in the length direction of the conveyor 51. The stage can be easily formed by use of a known linear movement mechanism. Upon exposure to the stimulating rays, the sheet 52 emits light in proportion to the stored radiation energy. The emitted light enters the photodetector 59 via the light guide member 60, and a radiation image signal S corresponding to the radiation image stored on the sheet 52 is generated by the photodetector 59. The radiation image signal S is fed to an image processing means 63, necessary image processing is carried out by the image processing means 63 in accordance with an instruction specified by a keyboard 64, and the processed radiation image signal S is stored on a storage medium such as a magnetic disk in a storage means 65. Also, the name of the object of the radiation image signal S read out in the manner as mentioned above, the date of image recording and other ID information for specifying the radiation image signal S are entered from the keyboard 64, and are stored on the storage medium such as a magnetic disk in the storage means 65 together with the radiation image signal S. After the radiation image is read out in this manner, the conveyor 51 is further moved by the distance of one-third the circumference thereof and stopped. In this condition, the sheet 52 from which the radiation image has been read out is opposed to the erasing light source 61, and exposed to the erasing light produced thereby to eliminate the radiation energy of the radiation image remaining on the sheet 52 after the read-out step, the radiation emitted by radioactive isotopes such as Ra266 and K40 existing in trace amounts in the stimulable phosphor, and environmental radiations stored in the stimulable phosphor. In this manner, the sheet 52 is recovered to the condition reusable for further image recording. Thereafter, the conveyor 51 is moved by the distance of one-third the conveyor circumference until the erased sheet 52 faces the radiation source 55. Midway during this movement, dust on the surface of the sheet 52 is removed by the cleaning roller 62. The sheet 52 free from any radiation energy and dust is reused to record a radiation image at the radiation source 55. A character display device 66 is used for investigating whether the information entered from the keyboard 64 is or is not correct.

The radiation image signal S and the ID information corresponding thereto stored on the storage medium such as a magnetic disk by the storage means 65 are then stored in the storage means 41 of the fourth radiation image diagnostic apparatus in accordance with the present invention shown in FIG. 5 via the storage medium.

The radiation image recording and read-out apparatus is not limited to the apparatus using the stimulable phosphor sheet and may, for example, be an apparatus for recording an X-ray image on a conventional X-ray photographic film and then reading out the X-ray image by scanning carrying the X-ray photographic film.

Also, the radiation image signal and the ID information need not necessarily be stored in the storage means 41 via the storage medium such as a magnetic disk in the manner as mentioned above. For example, the fourth radiation image diagnostic apparatus shown in FIG. 5 and the radiation image recording and read-out apparatus shown in FIG. 6 may be connected by a communication line, and the radiation image signal obtained by the radiation image recording and read-out apparatus may be directly stored in the storage means 41 via the communication line.

A embodiment of the fifth radiation image diagnostic apparatus in accordance with the present invention will hereinbelow be described with reference to FIG. 7A.

Figure 7A:
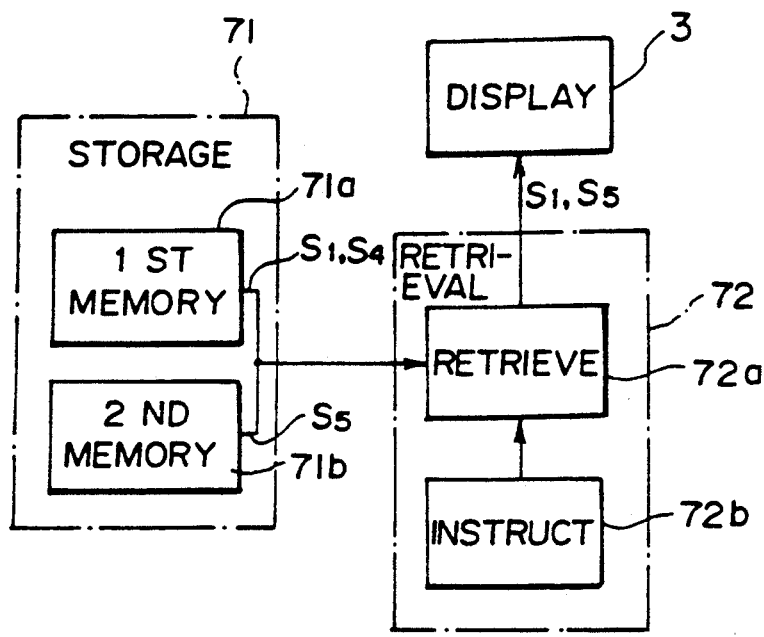
FIG. 7A is a block diagram showing an embodiment of the fifth radiation image diagnostic apparatus in accordance with the present invention.

With reference to FIG. 7A, a plurality of the radiation image signals S1, S1, ... representing a plurality of radiation images of objects and the kind information S4 on the respective radiation image signals S1, S1, ... obtained by, for example, the radiation image recording and read-out apparatus shown in FIG. 6 are stored in a first memory 71a of a storage means 71.

Also, radiation image signals representing standard appearances of various diseases in radiation images and radiation image signals representing typical radiation images or the like in various steps of progress of a specific disease are selected based on long experience from a plurality of the radiation image signals obtained by, for example, the radiation image recording and read-out apparatus as shown in FIG. 6, and are stored as standard image signals in a second memory 71b of the storage means 71. The standard image signals stored in the second memory 71b are not limited to the radiation image signals obtained by the radiation image recording and read-out apparatus shown in FIG. 6, and may be obtained from other read-out means or the like and stored in the second memory 71b via a magnetic disk, a magnetic tape or the like. In the case where already-formed standard images are available, the standard image signals may be obtained by reading out the standard images by use of a digitizer or the like, instead of selecting the standard image signals from a plurality of the radiation image signals as mentioned above. The first memory 71a and the second memory 71b may be or may not be physically separated from each other, and are herein referred to as being conceptually separated from each other for simplicity of explanation.

At the time the radiation image signal S1 which is to be displayed on the display means 3 is specified from an instruction input section 72b comprising a keyboard or the like in a retrieval means 72 into a retrieval section 72a in the retrieval means 72, the retrieval section 72a retrieves the specified radiation image signal S1 from the radiation image signals stored in the first memory 71a, retrieves the kind information S4 on the radiation image signal S1, and sends the retrieved radiation image signal S1 to the display means 3. Also, on the basis of the kind information S4, the retrieval section 72a retrieves a single standard image signal S5 or a plurality of standard image signals S5, S5, ... corresponding to the radiation image signal S1, which is related to diagnosis and which has been read from the first memory 71a, from a plurality of standard image signals stored in the second memory 71b.

The single standard image signal S5 or a plurality of the standard image signals S5, S5, ... thus retrieved are sent to the display means 3. On the basis of the fed radiation image signal S1 and the standard image signal S5, the display means 3 reproduces and displays a radiation image and a standard image side by side so that they can be viewed simultaneously. The display means 3 may display the images in the same manner as in the example of display based on the radiation image signal S1' and the standard image signal S5' in the second and third radiation image diagnostic apparatuses in accordance with the present invention as mentioned above with reference to FIGS. 3A, 3B and 3C.

Figure 7B:
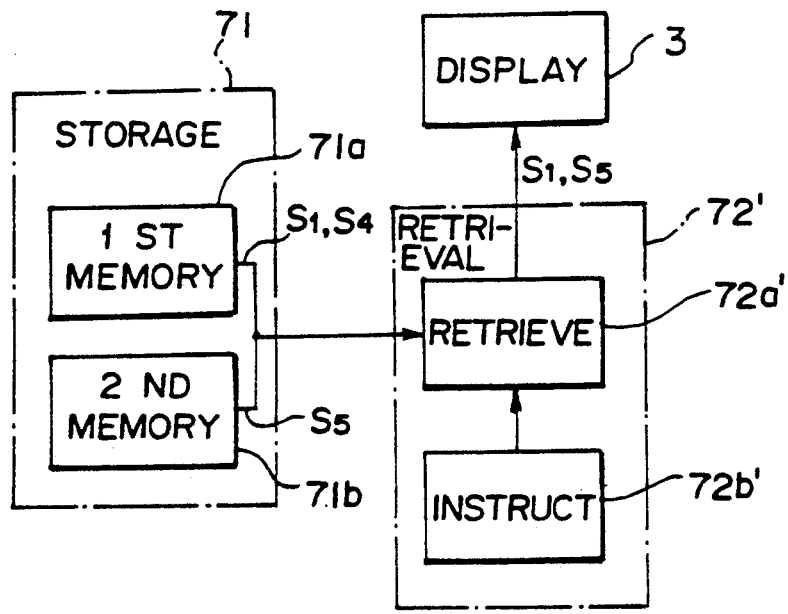
FIG. 7B is a block diagram showing an embodiment of the sixth radiation image diagnostic apparatus in accordance with the present invention.

An embodiment of the sixth radiation image diagnostic apparatus in accordance with the present invention will hereinbelow be described with reference to FIG. 7B. In FIG. 7B, similar elements are numbered with the same reference numerals with respect to FIG. 7A.

At the time the radiation image signal S1 which is to be displayed on the display means 3 is specified from an instruction input section 72b' comprising a keyboard or the like in a retrieval means 72' into a retrieval section 72a' in the retrieval means 72', the retrieval section 72a' retrieves the specified radiation image signal S1 from the radiation image signals stored in the first memory 71a, retrieves the kind information S4 on the radiation image signal S1, and sends the retrieved radiation image signal S1 to the display means 3. Also, on the basis of the kind information S4 and the retrieved radiation image signal S1, the retrieval section 72a' automatically discriminates the step in the kind of the radiation image signal S1. Thereafter, based on the kind of the radiation image signal S1 and the step discriminated automatically, the retrieval section 72a' retrieves a single standard image signal S5 or a plurality of standard image signals S5, S5, ... corresponding to the step of the radiation image signal S1 from a plurality of standard image signals stored in the second memory 71b. The term "single standard image signal S5" as used herein means, for example, the standard image signal S5 in the same step as the step to which the radiation image signal S1 belongs, and the term "plurality of standard image signals S5, S5, ..." means, for example, the standard image signals S5, S5 in two steps in the case where the radiation image signal S1 belongs to the middle between the two steps.

As in the fifth radiation image diagnostic apparatus in accordance with the present invention, the single standard image signal S5 or a plurality of the standard image signals S5, S5, ... thus retrieved are sent to the display means 3. The display means 3 reproduces and displays the radiation image and the standard image side by side so that they can be viewed simultaneously.

The embodiments of the fifth and sixth radiation image diagnostic apparatuses shown in FIGS. 7A and 7B are not provided with the image processing means for carrying out image processing of the radiation image signal. However, appropriate image processing may be carried out on the radiation image signal obtained by, for example, the radiation image recording and read-out apparatus, and the processed radiation image signal may be transferred to the fifth and sixth radiation image diagnostic apparatuses in accordance with the present invention. In this case, the fifth and sixth radiation image diagnostic apparatuses in accordance with the present invention need not be provided with the image processing means. It is also possible to constitute a radiation image diagnostic apparatus provided with the image processing means.

By way of example, as mentioned above for the retrieval means 35' in the third radiation image diagnostic apparatus in accordance with the present invention, the method wherein a radiation image of pneumoconiosis is taken as one kind and a step in said kind is automatically discriminated may be employed as the method of automatically discriminating the step in the kind of the radiation image signal S1 in the retrieval means 35'.

After the step of the pneumoconiosis radiation image is automatically discriminated by carrying out the aforesaid operations as represented by Formulas (1) to (9) in the retrieval section 72a', the standard image signal corresponding to said step is read from the second memory 71b and sent to the display means 3, and the standard image is reproduced and displayed together with the pneumoconiosis radiation image on the display means 3.

In the case of the embodiments shown in FIGS. 7A and 7B, the date of image recording of the object corresponding to the read-out radiation image signal S and other ID information specifying the radiation image signal S, and the name of disease and other kind information are entered from the keyboard 64 in the radiation image recording and read-out apparatus shown in FIG. 6. The ID information and the kind information are stored together with the radiation image signal S.

The radiation image signal S, and the ID information and the kind information corresponding to the radiation image signal S stored on the storage medium such as a magnetic disk by the storage means 65 shown in FIG. 6 as mentioned above are then stored in the storage means 71 of the fifth or sixth radiation image diagnostic apparatus in accordance with the present invention as shown in FIG. 7A or FIG. 7B via the storage medium.

Also, the radiation image signal, the ID information and the kind information need not necessarily be stored in the storage means 71 via the storage medium such as a magnetic disk in the manner as mentioned above. For example, the fifth radiation image diagnostic apparatus shown in FIG. 7A or the sixth radiation image diagnostic apparatus shown in FIG. 7B and the radiation image recording and read-out apparatus shown in FIG. 6 may be connected by a communication line, and the radiation image signal obtained by the radiation image recording and read-out apparatus may be directly stored in the storage means 71 via the communication line.

I claim:

1. A radiation image diagnostic apparatus comprising:
   i) a read-out means for obtaining a radiation image signal representing a radiation image of an object from a recording medium carrying said radiation image of said object recorded thereon,
   ii) a kind input means for entry of a kind of said object,
   iii) a storage means for storing standard image signals obtained from standard images representing standard conditions of radiation images,
   iv) an image processing means for carrying out image processing of said radiation image signal obtained by said read-out means,
   v) a retrieval means for retrieving a single standard image signal or a plurality of standard image signals corresponding to said radiation image signal, which are stored in said storage means, on the basis of the kind entered from said kind input means, and
   vi) a display means for reproducing and displaying the radiation image which said radiation image signal obtained by said read-out means represents and a standard image which said standard image signal retrieved by said retrieval means represents, said display means displaying said radiation image and said standard image side by side so that they are viewed simultaneously.

2. An apparatus as defined in claim 1 wherein said standard image signals stored in said storage means include a plurality of standard image signals each representing each step of pneumoconiosis.

3. A radiation image diagnostic apparatus comprising:
   i) a read-out means for obtaining a radiation image signal representing a radiation image of an object from a recording medium carrying said radiation image of said object recorded thereon,
   ii) a kind input means for entry of a kind of said object,
   iii) a storage means for storing a plurality of standard image signals obtained from standard images representing standard conditions of a plurality of steps of radiation images for each of a plurality of kinds,
   iv) a retrieval means for automatically discriminating the step in the kind of said radiation image signal obtained by said read-out means, and retrieving a single standard image signal or a plurality of standard image signals corresponding to said step of said radiation image signal, which are stored in said storage means, on the basis of the kind entered from said kind input means and said step discriminated automatically, and
   v) a display means for reproducing and displaying the radiation image which said radiation image signal obtained by said read-out means represents and a standard image which said standard image signal retrieved by said retrieval means represents, said display means displaying said radiation image and said standard image side by side so that they are viewed simultaneously.

4. An apparatus as defined in claim 3 wherein said standard image signals stored in said storage means include a plurality of standard image signals each representing each step of pneumoconiosis.

5. A radiation image diagnostic apparatus comprising:
   a storage means for storing a radiation image signal obtained from a radiation image of an object, a kind corresponding to said radiation image signal, and standard image signals obtained from standard images representing standard conditions of radiation images,
   ii) a retrieval means for retrieving a single standard image signal or a plurality of standard image signals corresponding to said radiation image signal, which are stored in said storage means, on the basis of the kind of said radiation image signal stored in said storage means, and
   iii) a display means for reproducing and displaying the radiation image which said radiation image signal read from said storage means represents and a standard image which said standard image signal retrieved by said retrieval means represents, said display means displaying said radiation image and said standard image side by side so that they are viewed simultaneously.

6. An apparatus as defined in claim 5 wherein said standard image signals stored in said storage means include a plurality of standard image signals each representing each step of pneumoconiosis.

7. A radiation image diagnostic apparatus comprising:
  i) a storage means for storing a radiation image signal obtained from a radiation image of an object, a kind corresponding to said radiation image signal, and a plurality of standard image signals obtained from standard images representing standard conditions of a plurality of steps of radiation images for each of a plurality of kinds,
  ii) a retrieval means for automatically discriminating the step in the kind of said radiation image signal stored in said storage means, and retrieving a single standard image signal or a plurality of standard image signals corresponding to said step of said radiation image signal, which are stored in said storage means, on the basis of the kind of said radiation image signal and said step discriminated automatically, and
  iii) a display means for reproducing and displaying the radiation image which said radiation image signal read from said storage means represents and a standard image which said standard image signal retrieved by said retrieval means represents, said display means displaying said radiation image and said standard image side by side so that they are viewed simultaneously.

8. An apparatus as defined in claim 7 wherein said standard image signals stored in said storage means include a plurality of standard image signals each representing each step of pneumoconiosis.

* * * * *